Patented Oct. 3, 1939

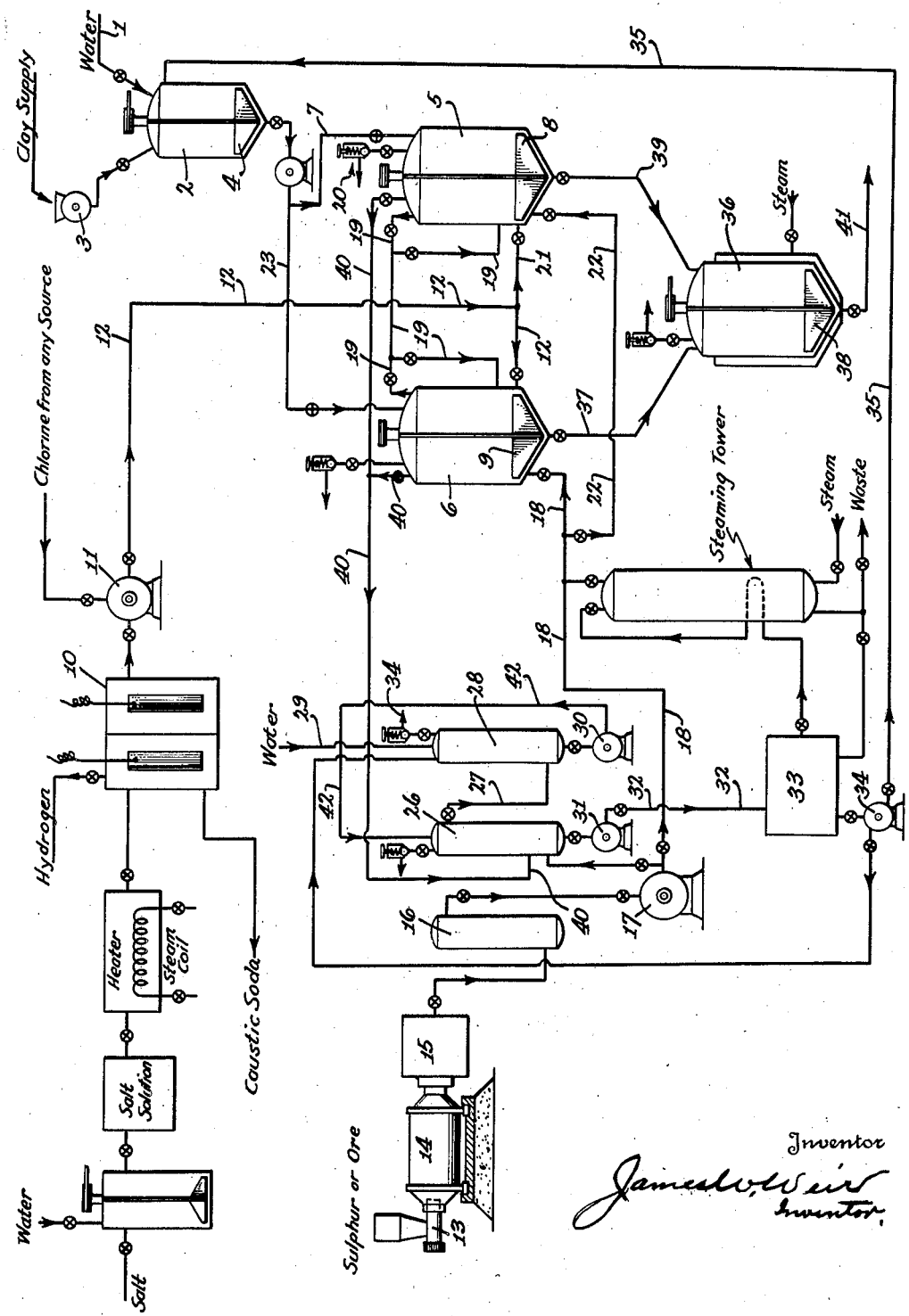

2,174,610

UNITED STATES PATENT OFFICE 2,174,610

METHOD OF ACTIVATING CLAYS

James W. Weir, Los Angeles, Calif., assignor of one-third to Henry S. Montgomery, South Pasadena, Calif.

Application February 27, 1939, Serial No. 258,737

2 Claims. (Cl. 252—2)

This invention relates to a process of activating clays and has for its object both to improve and increase the decolorizing, refining, catalytic, clarifying, purifying, and adsorptive properties of clay or kindred substances when hydrocarbon oils, petroleum oils, vegetable oils, animal oils, waxes, fats, sugar solutions, and all liquids capable of being refined or treated with such a material, are contacted with or filtered through a body of such material.

In the specifications and claims of this invention the word "clay" is used in a broad sense and is meant to comprise and include the substances known as bauxite, willonite, pyrophyllite, kaolinite, fuller's earth, montmorillonite, diatomaceous earth, bentonite, green sands, premutite, barromite, heulandite, phyllipsite, hormatone, stillbite or desmine, laumontite, chabazite, analcite, natrolite, scolesite, thompsonite, aluminum silicate clays, magnesium clays, leverrierite, Wyoming rock clays, Otai clays, Death Valley clays including both the aluminum silicate and magnesium silicate types, and kindred substances, whether as naturally mined or after a previous use of the clay.

Another object of this invention is the production of activated clay, which is a new composition of matter, from clays having little or substantially no practical value as an activated clay. This new product, which is unlike others, is the result of the use of different chemicals, applied in a different way, in different proportions, in a different chemical state, in a different physical state, wherein different reactions occur, different compounds are formed, different reaction compounds are removed, therefore, there remains a new residual material.

The words "activated clay" as herein used shall be construed to mean and include substances and activated materials having decolorizing, refining, catalytic, clarifying, purifying, neutralizing, or adsorptive properties, when liquid hydrocarbons, petroleum oils, vegetable oils, animal oils, waxes, fats, sugar solutions, and all liquids capable of being refined or treated with such a material are contacted therewith or filtered therethrough.

Another object of this invention is to utilize any available gas or vapor which may be manufactured from any suitable material or by-product or otherwise produced, as a cheap source of supply of chemicals applicable to the process, and especially to utilize the by-products of industrial chemical manufacturing plants, smelters, refineries, etc., which said by-products are generally inert, for the successful treatments of clays. As stated, the gases above referred to are generally inert to the treatment of clays, but when combined with other gases or with other reagents as herein described, they become active by this invention.

Another object of this invention is to make possible the use of gaseous or liquid substances which are of themselves inert or substantially so for the treatment of clays and by the methods employed as herein described to become chemically reactive to clay.

Examples of such substances are sulphur dioxide, hydrogen, hydrogen sulphide, chlorine, the oxides of nitrogen, steam and water.

By "inert chemically to clay" as used in the specifications and claims of this invention, it is means that the reagent or substance referred to and employed is ineffective in the treatment of clays to produce a good grade of decolorizing material.

By this invention a combination of more than one of the above named types of substances is employed in the step of applying the chemicals to the clay under treatment, examples of which are the following combinations and methods which may be employed in applying the various substances mentioned. This new method of application causes the employed substances to become active and efficient chemical reagents in the treatment of clays.

Combinations and methods of application are:

Sulphur dioxide and chlorine

1. The two gases are introduced into an aqueous solution containing clay simultaneously and concurrently until the required amount of the chemicals is added to treat the clay in the solution.

2. Sulphur dioxide is introduced into an aqueous solution containing clay until the required amount of sulphur dioxide is dissolved in same, being sufficient to treat the clay present in the solution. Chlorine is then introduced till the desired treatment is accomplished.

3. To a required quantity of water to make a solution with a desired weight of clay dissolve the required quantity of sulphur dioxide before the clay is added to the solution. Then add the desired quantity of clay to the water-sulphur-dioxide solution. Then introduce chlorine into the said solution containing the clay until the desired treatment is accomplished.

The above sequence of introducing the gases into the solution may be reversed in order of procedure; that is to say, the chlorine may be used first in the series of steps followed by the sulphur dioxide. This also applies to all other combinations of two or more gases employed in the process, such as hydrogen sulphide, sulphur dioxide, and chlorine.

It is understood that the order of procedure and the sequence of all steps may be changed and reversed in the operation and the application of this process and such steps are meant to be included in the specification and claims of this invention.

*Chlorine and hydrogen*

1. The two combining gases or their reaction products may be introduced into an aqueous solution containing clay directly from a reaction chamber.

*Chlorine and hydrogen sulphide*

The two gases may be introduced into an aqueous solution containing clay.

*Sulphur dioxide and the oxides of nitrogen*

The plurality of gases is introduced, in the presence of steam, into an aqueous solution containing clay.

This invention, for the purposes herein recited, comprises and includes the use of gaseous substances and any plurality of gaseous substances of the group, sulphur dioxide, hydrogen sulphide, chlorine, the oxides of nitrogen, hydrogen, steam, and all gases which will chemically inter-react with each other in the combinations as employed in the presence of an aqueous solution containing clay, and will chemically react upon the said clay and cause an improvement in the quality of the treated clay product as an activated clay over the untreated clay.

In the process gases may be introduced into the solution employed through separate conduits without admixture or through pre-mixing chambers, inter-mixed therein before entering the solution.

Such substances as HCl gas and SO₃ vapor are each good active treating reagents for clays when used alone and introduced into an aqueous solution containing clay.

By using this invention activated clay may be produced of a better quality than the best standard brand on the market and equal to the best decolorizing material that, to our knowledge, can be made by any known treating process. This statement is made after having produced such a material and submitting it to comparable tests.

The reason and theory is thought to be tha the superior quality of the finished product is the result of using reagents that inter-react to form active reagents in the presence of the clay and while in a nascent state react with the clay. By the term "nascent" I mean that the active reagents as formed are in a lightly ionized and reactive state.

When the words "burning of sulphur" are used in the specification and claims of this invention, it is meant to include the burning of all substances containing sulphur which may be burned to produce sulphur dioxide, including hydrogen sulphide in the non-condensable gases from refining or destructive distillation of petroleum or coal and its products.

In the accompanying diagrammatic drawing is illustrated an apparatus suitable for demonstrating the manufacture of sulphur dioxide from the burning of sulphur or substances containing combined sulphur, and the production of chlorine from salt by electrolysis or from other sources, and the method of their use by this invention and referring to the said drawing.

Approximately eight parts by weight of water through pipe 1 is run into mixer 2, one part by weight, of clay from crusher 3, is run into water in mixer 2, while being agitated with stirring paddle 4, until reduced to a finely divided condition, which then passes through pipe 7—23, into treating tanks 5 and 6 to fully charge them in equal quantities while being agitated with paddles 8 and 9.

The two treating tanks 5 and 6 are connected in a reversible series, and as here illustrated, tank 6 is the primary treating tank and treating tank 5, as a secondary treating tank, is acting to absorb any excess of either gas inadvertently introduced into treating tank 6, which through solution containing clay under treatment, passes out through pipe 19 into treating tank 5, into the solution therein containing clay, where by manipulating the manifold pipe arrangement, valves not shown, either chlorine through pipe 21, or sulphur dioxide through pipe 22 may be introduced into said treating tank 5 and into said solution to maintain a proper proportionate ratio between the gases in the said solution to react with any such aforementioned excess gas in the presence of the clay in the said solution. This regulation to maintain the proper proportions of gases as employed is continuous during the operations.

The primary treating tank 6, as above shown, contains clay in a finely divided condition dispersed in water and under agitation, and in readiness for the treating step which follows in this described embodiment of this invention, and comprises the use of two gases which are introduced simultaneously and concurrently into the said treating tank 6.

One of the said two gases is chlorine, which, coming from electrolytic cell 10 by compressor 11, is introduced through pipe 12 into primary treating tank 6.

The other of the said two gases is the combustion gas containing sulphur dioxide coming from the burning of sulphur or substances containing combined sulphur, which is fed by automatic feeder 13 into rotary burner 14 from whence the combustion gases pass through combustion chamber 15, air cooler 16, compressor 17, which through pipe 18 introduces it into said primary treating tank 6.

By regulating the rate of flow of the above two gases entering treating tank 6, they are inter-mixed in the proper proportions to chemically interreact with each other and while in a nascent state, react with the clay under treatment in the aqueous solution, and the flow of gases is continued until the desired predetermined quantity of the two gases is delivered to effect the desired treatment of the clay. The quantity of the two gases used depends upon whether a high or low treatment is desired, that is, whether a high grade or low grade product is required to meet the consumer demand. The excess or partly spent gas or vapor passes out of the treating tank 6, through pipe 19, into treating tank 5, through solution therein containing clay and the waste gases pass out through loaded valve and vent 20.

When treatment of the clay in the solution in treating tank 6 is complete, the proper valves, not shown, are opened and closed and the chlorine and sulphur dioxide gases are switched and directed through pipes 12—21, and 18—22, into the solution containing clay in treating tank 5, and then treating tank 6 is emptied through pipe 37 into steam jacketed digester 36 while being agitated with paddle stirrer 38 and steam heat is applied to the solution containing the clay in digester 36 where a boiling temperature is maintained until from 25% to 50% of the water is evaporated from the solution containing the clay, or sufficient time has been allowed for complete reaction with the clay present in the solution.

Then the solution containing the clay is withdrawn from digester 36, through pipe 41, and by conventional and well-known methods not described, reaction products are removed from the clay and the treated product is prepared for disposition in any preferred manner.

As above illustrated, normal pressures and temperatures were employed up to the digestion step in digester 36.

In the shell stank type apparatus as indicated in drawing, and with compressors as shown, pressures up to one hundred pounds or more could be used, and higher pressures and temperatures could be utilized with tubular type apparatus or equipment properly designed to withstand high pressures and temperatures, the desirable limitations being controlled by the nature of the substances employed in the treating process.

In this new process the higher the pressure and temperature employed the more rapid and complete is the interreaction between the substances employed and the reaction with the clay under treatment.

It is understood that, for the purposes herein recited, the scope of this invention shall comprise and include operations at all pressures and from low to high temperatures.

The word "gas or gases" as herein employed is meant to mean and include all substances herein employed that are gases or vapors at normal pressure and temperature.

At low temperatures the preferred substances employed in this invention may become liquids or solids and at normal temperature may be held in a liquid state under pressure.

Therefore, this invention, for the purposes herein recited, comprises and includes the use of sulphur dioxide and chlorine in the manner herein described in all forms, gaseous, liquid, solid, and in aqueous solutions.

In one of the preferred embodiments of this invention sulphur dioxide is employed in an aqueous solution into which clay is added, then chlorine is introduced into the said aqueous sulphur dioxide solution containing clay, where inter-reaction takes place between the chlorine and the sulphur dioxide and a reaction occurs with the clay present therein.

The aqueous sulphur dioxide solution may come from any source to be used as such in the process, or it may be made in any preferred manner, such as by absorbing in water sulphur dioxide from the combustion gases of burning sulphur, or by adding it to water in a gaseous, liquid, or solid form. This may be considered as treating the clay with the liquid sulphurous acid. Sulphur dioxide, sulphurous acid, and aqueous solutions of sulphur dioxide are not good active treating reagents for clay and only become so when chlorine, or some substance that will react with it, is added as herein described.

A new and novel feature of this invention, which is meant to be comprised and included therein, is the use of either or both gaseous or liquid substances that are inert chemically to clay which by the combined use of more than one of the said substances, as herein described, become active and efficient treating reagents for clay.

The words "finely divided" as herein used in the specification and claims, is meant to include coarsely crushed clay as well as finely comminuted clay, and in the process it is only necessary to have the clay particles sufficiently small to permit intimate contact with the substances employed to make a uniform and thorough treatment of the clay.

In the solutions of the treating step the amount of water used in proportion to the clay present may vary in wide proportions from a very liquid condition of the clay to a mass comparatively dry, but still of sufficient water content to insure no loss of active reagents, that is to say, the water content of the clay may vary through a wide range without detrimental affect upon the clay treatment, care being taken not to over-saturate the mixture with reagents due to lack of water.

The words "in an aqueous solution" are meant to include solutions of all proportions with reference to the relative weights of water to clay in the solutions employed. It is not meant that the clay is in solution. It is meant that the clay is present in a solution or moist condition in which the water or moisture present is sufficient to bring about inter-reactions between the substances employed and a reaction with the clay present under treatment.

The following is a second illustration of methods of carrying out the invention.

Referring to drawing:

To avoid repetition will assume that the sulphur burner is in operation.

Treating tanks 6 and 5 are charged with solution containing clay under agitation.

Combustion gases from the burning of sulphur of approximately 10% sulphur dioxide content are delivered by compressor 17 through pipe 18 into an aqueous solution containing approximately eight parts water and one part clay, by weight, in treating tank 6, until approximately 6% by weight based upon clay present in the solution, is absorbed therein. The partially spent gases pass out through pipe 19, through solution containing clay in treating tank 5 and partially spent gas passes out through pipe 40 into absorber 26, to be finally stripped of sulphur dioxide. If already completely stripped, it is allowed to escape through vent 20.

When the solution containing clay has absorbed the desired amount of sulphur dioxide in treating tank 6, the gas is switched through pipe 18—22 into and through solution containing clay in treating tank 5 out through pipe 40 into absorber 26, for striping of sulphur dioxide.

Then chlorine from electrolytic cell 10, by compressor 11, through pipe 12, is introduced into clay-sulphur-dioxide solution in treating tank 6, until desired treatment is completed.

Then the treated clay in the solution from treating tank 6 is transferred through pipe 31 into digester 36, where during agitation with stirring paddle 38, steam heat is applied until by boiling 25% to 50% of the water content is evaporated, or until reaction is complete with the clay.

Then the treated clay in the solution is withdrawn through pipe 41 and water soluble reaction products removed therefrom and the treated product is prepared for disposal in any preferred manner.

The following is a third illustration of methods of carrying out the process.

Referring to the drawing:

Sulphur introduced through automatic feeder 13 is burned in rotary burner 14, combustion chamber 15, to about 10% sulphur dioxide content in combustion gases which is pumped with compressor 17, through absorber 26, line 27, and absorber 28, waste gases escaping through loaded valve and vent 34.

During this operation water is being circulated counter-current to said combustion gases by introducing water through pipe 29 into top of absorber 28 out by pump 30, through pipe 42, into top of absorber 26, out by pump 31 through pipe 32, into sulphur dioxide solution tank 33.

Approximately eight parts of water to one of clay, by weight, may be used in treating the clay in the solution. 6% by weight of sulphur dioxide, approximately, is required to treat the clay (based on weight of clay).

Therefore, from sulphur dioxide solution tank 33, through pump 34, pipe 35, sufficient sulphur dioxide solution is delivered into mixer 2, the sulphur dioxide content of which will equal 6% of the weight of the clay to be treated. Then through pipe 1, add sufficient water into mixer 2 to make the aqueous solution content eight parts by weight of the clay to be treated in same. Then from crusher 3, during agitation with stirring paddle 4, one part of clay is run into the eight parts of solution in mixer 2 and the clay in the aqueous sulphur dioxide solution is reduced to finely divided condition. Then from mixer 2 the sulphur-dioxide-clay-solution through pipes 7 and 23, is run in equal quantities into treating tanks 5 and 6 during agitation with stirring paddles 8 and 9. Then chlorine from electrolytic cell 10, by compressor 11, through line 12, is introduced into treating tank 6 into the sulphur-dioxide-clay-solution, the partially spent gas passing through pipe 19 into treating tank 5 through sulphur-dioxide-clay-solution, the waste gas passing out through vent 20. When the treatment is completed, the chlorine is switched through pipes 12—21 into treating tank 5, and from tank 6 the solution containing the treated clay is transferred through pipe 37 to digester 36, during agitation with paddle 38, and steam heat is applied until 25% to 50% of the water in the solution is evaporated, or until the reaction with the clay is complete.

Then the treated clay in the solution is withdrawn through pipe 41 and water soluble reaction products removed therefrom and the treated product is prepared for disposal in any preferred manner.

In practicing this invention there is in the treating step what is termed herein an inter-reaction zone or period wherein the plurality of substances employed react together to form products which react upon the clay present in an aqueous solution of sufficient water content to bring about the desired reactions. In this inter-reaction zone the plurality of substances, for economical reasons, must be present in quantities of proper proportions to react together completely without loss. Such proportions are quantities which are in direct ratio to the combining molecular weight of the substances employed. Any excess over such quantities is lost if the excess of the substance employed has not a further and additional beneficial effect upon the clay under treatment.

For example in the use of chlorine and sulphur dioxide, the proportions required in the inter-reaction zone are 70.92 parts of chlorine and 64.06 parts of sulphur dioxide, by weight, and for efficient results conditions must be maintained to contact the substances in such proportions. Due to the complex reactions as brought about by this invention, an excess of either of these two substances may react as bleaching agents or otherwise to contribute to the superior quality of the finished treated product.

In practicing this invention, minimum quantities of all the substances, including water, employed in the process may be more efficiently applied by the use of high temperatures and pressures. High temperatures are meant to mean and include temperatures above the normal boiling points of the aqueous solutions of the substances employed, and up to the critical temperature which may be applied to the apparatus under operating conditions. High pressures are meant to include pressures sufficient to maintain, at the existing temperature, the aqueous solutions employed in the liquid phase to at least such an extent that the vapor phase present is the smaller portion as compared to the liquid phase. Such pressures may be as high as 2,000 pounds per square inch.

In the acid treatment of hydrocarbon oils the acid reaction product is called acid sludge.

There are numerous processes employed in the refining art of recovering from the acid sludge, the acid used in treating, examples of which are:

1. Water or steam is added to the sludge and heat is applied and the solution is allowed to settle when it generally stratifies into three phases, the upper being oil, the middle being tar, the lower a weak acid solution. The weak acid solution is generally concentrated by heat or conventional methods or stronger acid. During all heating applications sulphur dioxide is generated which may be collected for use or disposal.

2. The sludge is heated in a closed retort, rotary internal type retort, or in any conventional manner in the presence of air or oxygen whereby a residual fuel of any state of dryness may be produced, sulphur dioxide is generated, a part or all of the volatile matter is vaporized, and the intermixed air, sulphur dioxide and vapor coming off together pass through a condenser where the condensable vapors are liquefied and removed and the remaining gases are passed through scrubbing, purifying, or burning steps, after which the sulphur dioxide may be absorbed in water, separated therefrom and liquefied or converted into $SO_3$ or $H_2SO_4$ by any of the well known methods.

The use of the sulphur dioxide and gases containing sulphur dioxide generated as above indicated is meant to be included and covered by this invention.

It is understood that this invention is not limited to the details herein described as preferred embodiments of the same and such embodiments are intended by way of example only, but this invention is of the scope defined in the specifications and the following claims.

I claim as my invention:

1. In the process of activating clay, the improvement in the method of applying activating agents, which comprises contacting comminuted clay suspended in water, with sulfur dioxide and chlorine gas, and finally separating activated clay from soluble products of reaction.

2. In the process of activating clay, the improvement in the method of applying activating agents, which comprises contacting comminuted clay in a water suspension, with sulfur dioxide and chlorine gas, forming sulfuric and hydrochloric acids in a highly ionized state, immediately reacting on the suspended clay with the ionized acids as generated and finally separating activated clay from water soluble products of reaction.

JAMES W. WEIR.